350-321

CROSS REFERENCE SEARCH ROOM

X350/321

Oct. 11, 1966 G. W. LESCHER 3,278,182

DEVICE FOR GENERATING THE SUBJECTIVE EFFECT OF COLOR

Filed May 21, 1964 4 Sheets-Sheet 1

INVENTOR.

George Wright Lescher

DEVICE FOR GENERATING THE SUBJECTIVE EFFECT OF COLOR

Filed May 21, 1964 4 Sheets-Sheet 2

INVENTOR.

George Wright Lescher

Oct. 11, 1966 G. W. LESCHER 3,278,182
DEVICE FOR GENERATING THE SUBJECTIVE EFFECT OF COLOR
Filed May 21, 1964 4 Sheets-Sheet 3

INVENTOR.
George Wright Lescher

DEVICE FOR GENERATING THE SUBJECTIVE EFFECT OF COLOR

Filed May 21, 1964

INVENTOR.

George Wright Lescher

United States Patent Office 3,278,182

Patented Oct. 11, 1966

3,278,182
DEVICE FOR GENERATING THE SUBJECTIVE EFFECT OF COLOR

George Wright Lescher, 303 Hillwood Drive, Nashville, Tenn.

Filed May 21, 1964, Ser. No. 369,218
18 Claims. (Cl. 272—8)

This invention relates to advertising devices, entertainment devices, and toys, and in particular to an arrangement of optically-functioning elements which operate optically to produce the ocular and subjective effect of chromatic color to the viewer when one of the elements thereof is in a continuously repetitive particular type of motion, even though the optically-functioning elements may present to the viewer only achromatic colors such as black and white when none of the elements are in motion.

A primary object of the invention is to provide means for producing new, novel, and unusual color effects over and about objects, pictorial representations, and printed, painted, written, drawn, marked, or otherwise physically displayed lines, bars, areas, marks, letters, figures, signs, characters, symbols, indicia, and the like, for use in connection with, but not limited to, entertainment or amusement devices and media, advertising purposes and devices and media, toy rotating tops and devices, and the like, and including televised and high-speed photographic reproductions thereof, in which the unique, perplexing, and intriguing feature resides in the apparent emanation of chromatic colors from displayed material which present only achromatic colors such as black and white, and in consequence thereof attracts and holds the attention and fascination of the viewer.

A further object is to provide such a device which does not of necessity require any specially-provided auxiliary equipment or specially-provided processing for its functioning with the desired effect, whether when viewed directly, or through "live" or taped television, or through high-speed motion picture photography and projection, or with respect to the normal processes, equipment, and techniques of such transmission or recording.

A further object is to provide such a device which is readily adapted to being manufactured, operated, adjusted, and altered if desired at very low cost in simple yet highly effective forms.

The underlying principles upon which the invention is founded appear to be the ocular and subjective phenomenon of apparent chromatic color resulting apparently from the diffraction of light at and around the junctures of displayed areas of rapidly contrasting changes in light intensities, the varying durations of the persistence of vision for different wave lengths of light, and the persistence of vision. I have found, in applying these principles in coordinated cooperation, that when an illuminated optical shutter element, hereinafter designated as the foreground shutter element, comprising one or more cycle units as herein defined, is moved within certain speed ranges and in continuous motion in front of a dark-shaded configurational element, as also herein defined, having therebehind an illuminated light-shaded background element, the configurational element takes on the appearance of having a chromatic hue even though the hues of the several elements may be exclusively achromatic, such as black and white.

For the purpose of clarity and uniformity of understanding throughout this specification and where used in the claims, the following words and phrases are here defined:

Viewable: Capable, when illuminated, of being seen by an observer or optically in the range of a lens stationed at any one common position at a distance from the color generating device.

Cycle unit: The basic unit of, or in or on, the moving foreground shutter element, and comprising the basic three essential segments thereof, namely at least one opaque essentially dark-shaded first segment, at least one opaque essentially light-shaded second segment, and at least one non-opaque third segment.

Dark-shaded: Of a light-absorbing dark hue of any chromatic or achromatic color, but preferably non-reflective jet black. Note the cross-hatching symbol used in the drawings to denote dark-shaded color; see the description of FIGURE 1 hereinafter in the descriptions of the views of the drawings.

Light-shaded: Of a highly contrasting light or pale hue of any chromatic color, such as pastel blue, or of light achromatic color such as light gray, but preferably of highly non-absorbent snow white or highly reflective silvery-lustered hue. The use of white within the pattern area, as defined below, denotes a light-shaded color.

Non-opaque: Optically apertured; light-transmitting such as transparent, or physically apertured such as cut out; neither light absorbing, reflective, nor dispersive.

Configurational element: The dark-shaded element which, by its position, size, shape, and degree of dark-shadedness, determines the location, intensity, character, and configuration of the resultant subjective effect of chromatic color formed against the light-shaded background element by the color generating device; may be disposed between the moving foreground shutter element and the background element, or on or in the background element, but not on or moving with the foreground shutter element.

Pattern area: That area of the device which, when the foreground shutter element is in motion, is viewable within the confines of the area traversed by the foreground shutter element's dark-shaded first segment, light-shaded second segment, and non-opaque third segment, and including that area of the dark-shaded configurational element and the light-shaded background element viewably within such confines; that is, that area of the device within which the subjective effect of chromatic color may be generated and appear.

The color effect is observable when the speed of the foreground shutter element is such that a cycle unit passes any given point at a frequency greater than about 3 cycles per second, and generally is optimum and most satisfactory at frequency ranges in the order of from about 6 to about 15 cycles per second. Satisfactory effects are obtainable when, for generating red-to-orange colors, and in the sequence of passing any given stationary point, the light-shaded second segment of the cycle unit comprises durationally from about 55% to about 15% of the cycle unit, the dark-shaded first segment from about 30% to about 50% thereof, and the non-opaque third segment from about 15% to about 35% thereof; and when, for generating blue-to-indigo colors, the dark-shaded first segment comprises durationally from about 50% to about 30% of the cycle unit, the light-shaded second segment from about 15% to about 55% thereof, and the non-opaque third segment from about 35% to about 15% thereof; and when, for generating yellow-to-green, the dark-shaded first segment comprises durationally from about 30% to about 50% of the cycle unit, a first light-shaded second segment from about 12% to about 28% thereof, the non-opaque third segment from about 7% to about 38% thereof, and a second light-shaded second segment from about 12% to about 28% thereof.

When the device is used in conjunction with standard commercial television broadcast, a preferred but not necessarily essential cycle unit frequency is about 10 cycle units per second, with the dark-shaded first segment of the cycle unit comprising durationally about 1/3 of the cycle unit and the non-opaque third segment about 1/3 thereof, for all colors; and with the light-shaded second segment about 1/3 of the cycle unit for red-to-orange and also for blue-to-indigo; and with the first light-shaded second segment about 1/6 of the cycle unit and the second light-shaded second segment also about 1/6 thereof, for yellow-to-green. With the standard television scanning frequency of 60 cycles per second, such frequency and such cycle unit segments arrangements permit one or more whole scanning impulses per whole cycle unit segment, and are thus in uniform phase.

When the device is used in conjunction with high-speed photographic and projection equipment, the preferred but not necessarily essential cycle unit frequency and durations of the several segments of the cycle unit are determined similarly by the number of film frames exposed or projected per second, such that one or more whole film frames are photographed or projected per whole cycle unit segment, for uniform phasing.

In general, preferred effects are obtainable when the one or more dark-shaded component areas comprising the configurational element do not individually embrace in projected widths an angle of more than about one degree in the eye of the viewer, dependency of course involving the distance between the viewer and the pattern area; for instance, if the configurational element or portions thereof are made up of lines or bars, with no means of magnification being introduced, then such lines or bars should preferably be not more than about 1/4 inch wide if the viewing position is expected to be about 15 inches from the pattern area, about 1/2 inch wide if about 30 inches away, about one inch wide if about 60 inches away, about 2 inches wide if about 120 inches away, and so on. The minimum width may acceptably be as small as about 1/64 inch if to be viewed about 15 inches away, about 1/32 inch if about 30 inches away, and so on, which values correspond to a minimum embraced angle of about 1/16 of one degree; except however when the device is used in conjunction with televised reproduction, such projected widths should preferably be not less than about 3/16 or 1/4 inch as measured on the face of the television receiver viewing screen, as a minimum desirable relationship with the width and spacing of conventional scanning beams.

A good mean embraced angle, subject to the foregoing preferred minimum limitation in televised reproduction, lies generally in the range of from about 1/4 to about 1/2 of one degree.

In further describing this invention, reference is had to the accompanying drawings in which like characters designate corresponding parts in all views.

In the drawings:

FIGURES 1–4 illustrate a first embodiment, and component elements thereof, of the invention, in which the foreground shutter element is essentially cylindrical, and rotatable about the longitudinal axis thereof. FIGURE 1 is a front view of this embodiment, showing the illuminated side thereof and taken from the general viewing position of the observer or a camera lens. In this figure, as in all other figures in the drawings, the type of cross-hatching shown is intended to indicate a light-absorbing dark-shaded color, either chromatic or achromatic, but preferably non-reflective jet black. This symbol is used since there is no standard available for such a situation, and since the use of the standard black symbol would denote the achromatic color black exclusively, and since the use of no symbol at all would lend confusion and lack of clarity of meaning in the figures illustrating this particular invention. The use of white within the pattern areas in shownings, in figures of the drawings, denotes a light-shaded color, hereinbefore defined.

Figure 5:
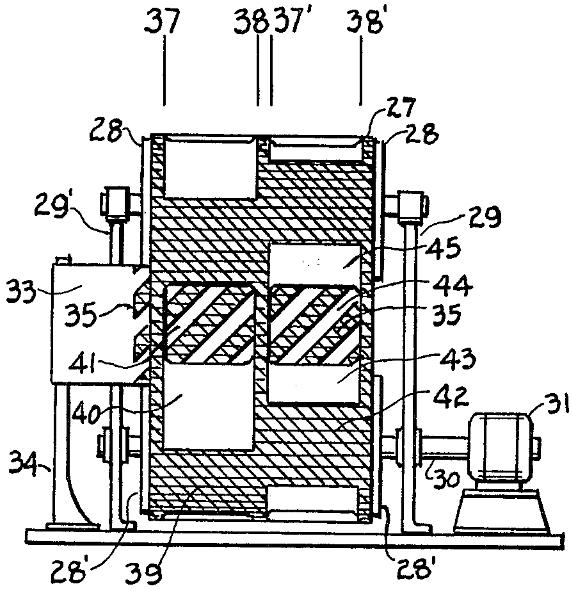

FIGURES 5–8 illustrate a second embodiment, and component elements thereof, of the invention, in which the foreground shutter element is essentially an endless strip moving translationally as an endless belt about a plurality of rotating drums. FIGURE 5 is a front view of this embodiment, showing the illuminated side thereof and taken from the general viewing position of the observer or a camera lens.

Figure 6:
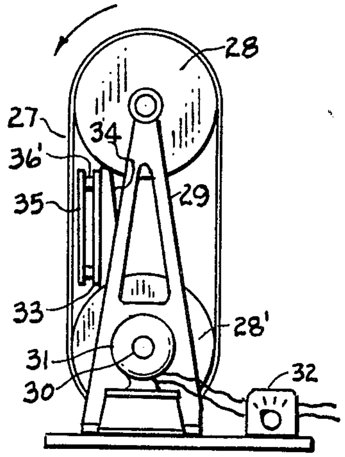

FIGURE 6 is a side view of the device shown in FIGURE 5.

Figure 7:
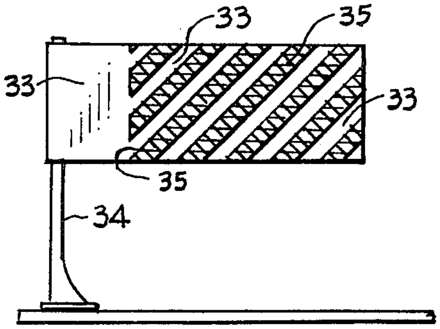

FIGURE 7 is a front view of certain elements of the FIGURE 5 device, with other elements omitted for clarity.

Figure 8:
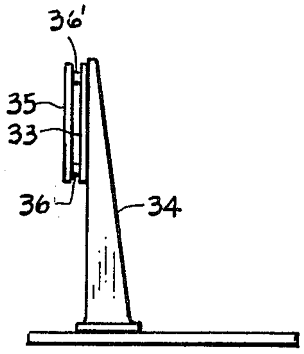

FIGURE 8 is a side view of the FIGURE 7 showing.

FIGURES 9–20 are representative of preferred forms of a third embodiment, and component elements thereof, of the invention, in which the foreground shutter element is essentially flat and rotatable about an axis central thereof and normal thereto. FIGURES 9–12 show a first preferred form, with FIGURE 9 being a front view of this form, showing the illuminated side thereof and taken from the general viewing position of the observer or a camera lens. In this form the foreground shutter element is supported essentially at and rotated essentially from the perimeter thereof.

Figure 9:
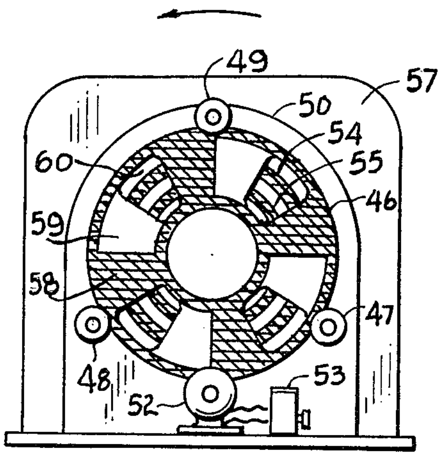
Figure 10:
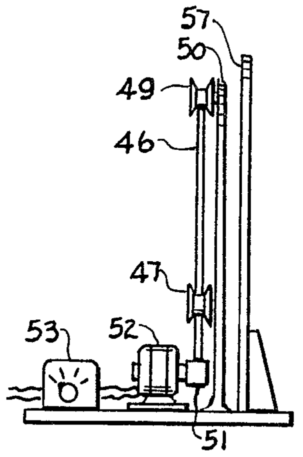

FIGURE 10 is a side view of the device of FIGURE 9.

Figure 11:
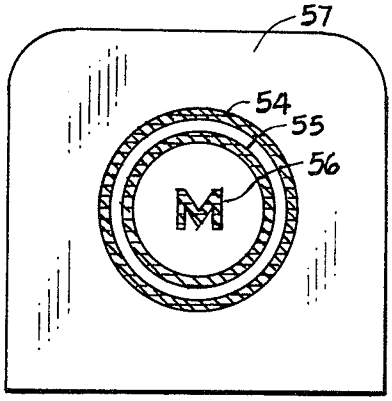

FIGURE 11 is a front view of two elements of the FIGURE 9 device, with the other elements omitted for clarity.

Figure 12:
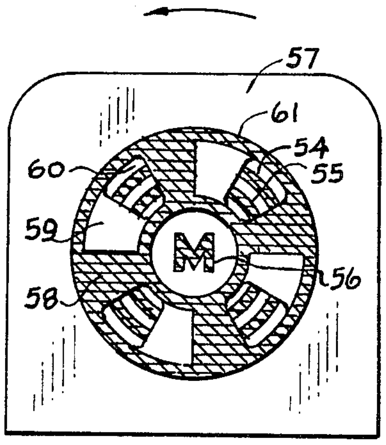

FIGURE 12 is a front view of three elements, showing a modified form of the foreground shutter element, of the FIGURE 9 device, with the other elements omitted for clarity.

Figure 13:
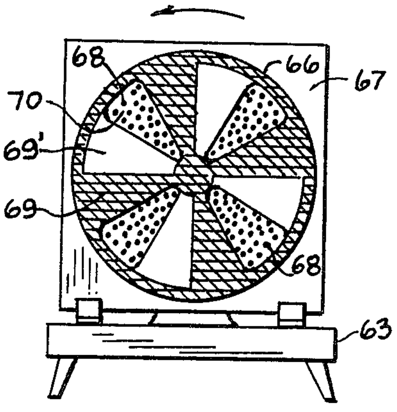

FIGURES 13–17 illustrate a second preferred form and component elements thereof, of the third embodiment, with FIGURE 13 being a front view of this form, showing the illuminated side thereof and taken from the general viewing position of the observer or a camera lens. In this form, the foreground shutter element is supported by, and rotated by means of, a shaft disposed concentrically along the axis of rotation thereof.

Figure 14:
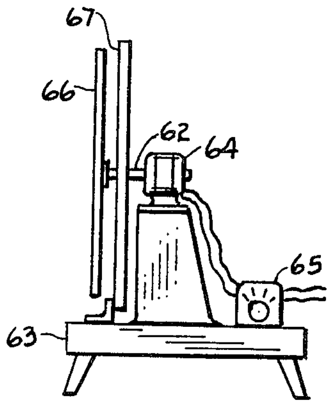

FIGURE 14 is a side view of the FIGURE 13 device.

Figure 15:
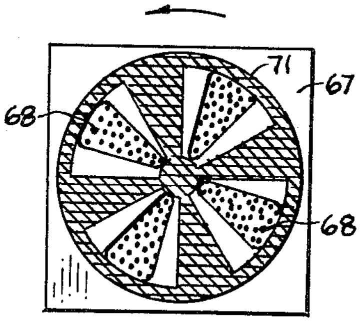

FIGURE 15 is a front view of three elements, showing a first modified form of one of the elements, of the FIGURE 13 device, with the other elements omitted for clarity.

Figure 16:
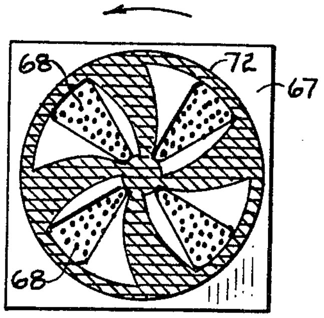

FIGURE 16 is likewise a front view of three elements, showing a second modified form of one of the elements, of the FIGURE 13 device, with the other elements omitted for clarity.

Figure 17:
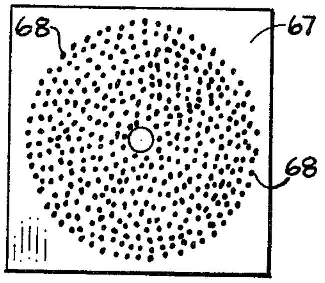

FIGURE 17 is a front view of two of the elements, with all of the other elements omitted for further clarity.

Figure 18:
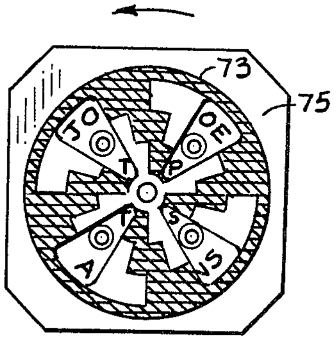
Figure 19:
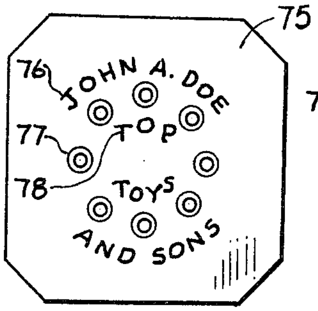
Figure 20:
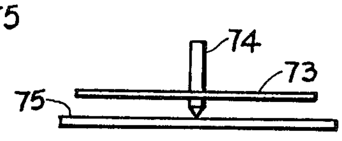

FIGURES 18–20 typify a third form, and component elements thereof, of the third embodiment, in which form the foreground shutter element is operated as a free-spinning top, with the axis of rotation being essentially vertical, and with the configurational element and the background element being disposed stationarily thereunder. FIGURE 18 is a plan view of this form, a spinning top, showing the illuminated upper side thereof and as seen from the general viewing position of the observer or a camera lens.

FIGURE 19 is a plan view of two of the elements of the FIGURE 18 device, with the other elements omitted for clarity.

FIGURE 20 is a side view of the FIGURE 18 device.

Figure 1:
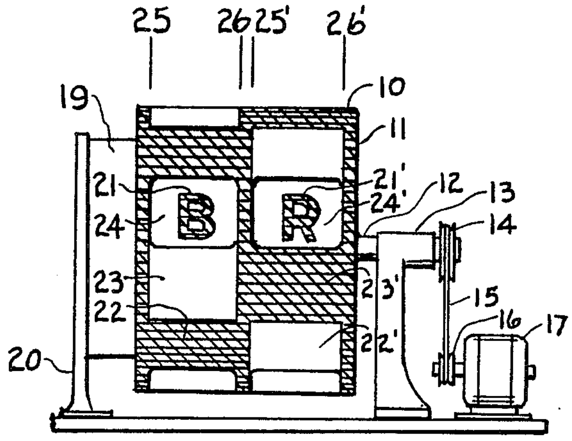
Figure 2:
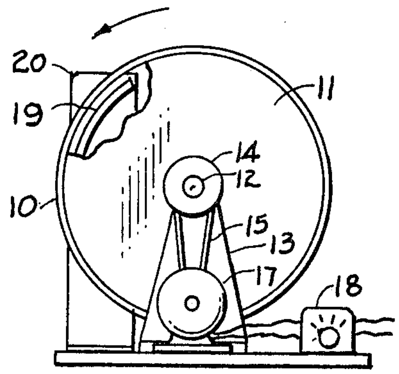
FIGURE 2 is a side view of the device shown in FIGURE 1.
Figure 3:
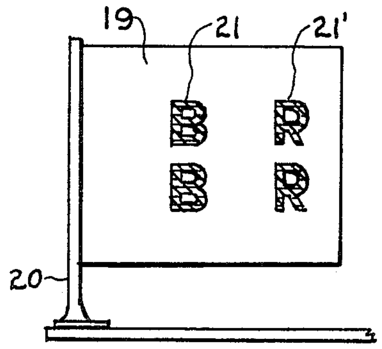
FIGURE 3 is a front view of certain elements of the FIGURE 1 device, with other elements omitted for clarity.
Figure 4:
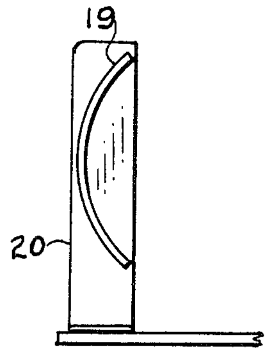
FIGURE 4 is a side view of the FIGURE 3 showing.

Proceeding now to FIGURE 1, which together with FIGS. 2–4 illustrates a first embodiment in which the foreground shutter element is cylindrical and rotatable about the longitudinal axis thereof, foreground shutter element 10 is a hollow cylinder which may be attached to and supported, through end member 11 cantileverly if desired, by shaft 12 which in turn may be supported by a bearing support 13 and caused to rotate by means of pulleys 14 and 16, belt 15, and electric motor 17, which may be connected through suitable speed-control means, such as a rheostat 18 shown in FIGURE 2, to a suitable source of electric current. Suitable means other than those illustrated may of course be employed for supporting, rotating, controlling, and powering foreground shutter element 10.

FIGURES 1–4 show background element 19, which may be supported and held in position by a suitable support member 20, and which is not in contact with foreground shutter element 10.

The viewable side, as shown in FIGURES 1 and 3, of background element 19, or at least that portion thereof lying within the pattern area, is light-shaded.

FIGURES 1 and 3 show two configurational elements, which are dark-shaded and in this instance may for support be affixed to or painted or printed on the viewable side of light-shaded background element 19. In this illustration, configurational element 21 comprises two letters B, as shown by FIGURE 3, and configurational element 21' comprises two letters R, also as shown.

The representation of the foreground shutter element 10 shown in FIGURE 1 shows two pattern areas, namely that lying in the area between lines 25 and 26 extended, and that lying between line 25' and 26' extended, with each pattern area being traversed by 4 cycle per revolution of foreground shutter element 10. For the pattern area between lines 25 and 26 extended, each of the 4 identical cycle units comprises an opaque dark-shaded first segment 22, an opaque light-shaded second segment 23, and a non-opaque third segment 24, in that sequence when foreground shutter element 10 is rotated in the anti-clockwise direction indicated by the arrow in FIGURE 2. It will be seen by FIGURE 1 that each of the two letters B comprising configurational element 21, as well as portions of light-shaded background element 19 therebehind, will become momentarily visible to the viewer as the non-opaque third segment 24 passes in front of each letter B.

The two letters B comprising configurational element 21 will appear to be of a blue-to-indigo color, against a light-shaded background, when foreground shutter element 10 is rotated in the anti-clockwise direction noted by the arrow in FIGURE 2 at a rate of more than about 3 cycle units per second, which corresponds to about ¾ revolution of the illustrated foreground shutter element per second.

If foreground shutter element 10 is rotated clockwise, opposite to the foregoing and directional arrow of FIGURE 2, the sequence of cycle unit segments passing before each of the two letters B will then of course be an opaque light-shaded second segment, then an opaque dark-shaded first segment, followed by a non-opaque third segment. Such reverse sequencing of cycle unit segments will then cause the two letters B to appear to be of a red-to-orange color.

Going now to the pattern area between lines 25' and 26' extended, it will be seen that the cycle unit segments sequencing, when foreground shutter element 10 is rotated anti-clockwise with the FIGURE 2 directional arrow, will be an opaque light-shaded second segment 22' followed by an opaque dark-shaded first segment 23' and then a non-opaque third segment 24'. As stated immediately foregoing, this sequencing produces a red-to-orange color; therefore, when foreground shutter element 10 is rotated in this anti-clockwise direction at more than about 3 cycle units per second, the two letters R comprising configurational element 21' will appear to be of a red-to-orange color, against a light-shaded background. Conversely, with opposite clockwise rotation of the foreground shutter element 10, the two letters R will appear to be blue-to-indigo.

FIGURE 5, together with FIGURES 6–8, typifies a second embodiment in which the foreground shutter element 27 is in the form of a flexible endless strip or belt supported by at least two rotating drums 28 and 28', which are in turn supported by bearing supports 29, 29'. Foreground shutter element 27 is caused to move in an essentially straight translational motion between the drums 28, 28', by means of a shaft 30 interconnecting drum 28' and electric motor 31, which is in turn controlled in rotational speed by speed control means such as a rheostat 32 connected, together with motor 31, with a source of electric power.

FIGURES 5–8 show background element 33, which may be supported and positioned by a suitable support member 34, and which is not in contact with foreground shutter element 27.

As in the illustration shown by FIGURES 1 and 3, the viewable side of background element 33, or at least that portion thereof lying within the pattern area is light-shaded.

FIGURES 5 and 7 depict a dark-shaded configurational element 35, consisting of a series of diagonal bars individually supported through spacers 36 and 36' shown in FIGURES 6 and 8 by light-shaded background element 33.

In using a foreground shutter element 27 shown in FIGURE 5 one pattern area lies between the lines 37 and 38 extended, and another pattern area between lines 37' and 38' extended, each being traversed by 4 identical cycle units per revolution of foreground shutter element 27. It will be seen, with the sequence of cycle units segments being an opaque dark-shaded first segment 39, an opaque light-shaded second segment 40, and then a non-opaque third segment 41, that the diagonal bars of configurational element 35 within the pattern area will appear to be of a blue-to-indigo color against a light-shaded background when foreground shutter element 27 is in motion in the direction indicated by the arrows of FIGURE 6. Conversely, as hereinbefore explained, the apparent subjective color will be red-to-orange when motion is in the opposite direction.

In the pattern area between lines 37' and 38' extended, in FIGURE 5, the configurational element 35 lying within that pattern area will appear to be of a yellow-to-green color, against a light-shaded background, when the foreground shutter element 27 rotates in either direction. In this case, regardless of direction of rotation, the cycle unit sequence is an opaque dark-shaded first segment 42, then a first opaque light-shaded second segment 43, followed by a non-opaque third segment 44, and then a second opaque light-shaded second segment 45.

All of the remaining FIGURES 9–20 illustrate preferred forms of a third embodiment, and component elements thereof, in which the foreground shutter element is essentially flat and rotatable about an axis central thereof and normal thereto.

The use of the word flat, or essentially flat, hereinafter and in the claims is intended to include a surface which may lie substantially in a plane and thus be strictly and technically flat, and also to include ones which may be somewhat conical, curvilinear, dished, or compoundly curved such that a casual observer would receive the impression of a generally flattened shape more so than of a conspicuously and decidedly conical or spherical shape.

While any suitable materials may be used in the construction of the various elements of the embodiments described herein, it has been found, particularly in the case of those described under the FIGURES 9–20 illustrations, that heavy paper board or poster board serves well and economically for foreground shutter elements, with either the opaque dark-shaded first segments or the opaque light-shaded segments of the cycle unit painted, inked, printed, or otherwise applied or affixed to the viewable side thereof; and with the non-opaque third segments being provided by cutting out apertures in the board at the proper locations. Similar materials are also quite practicable for background elements, with the viewable side being coated or covered, if necessary, to provide a light-shaded viewable surface, and with the dark-shaded configurational elements also being painted, inked, printed or otherwise applied or affixed to the viewable side thereof.

Further it might be noted here, although likewise applicable to all other embodiments, that configurational elements need not necessarily be stationary only, but may be movable and placed in motion before the light-shaded background element with no derogatory effect on the subjective color effects generated about the moving configurational elements provided the motion is relatively slow with respect to that of the moving foreground shutter element.

FIGURES 9–12 show a first preferred form of this third embodiment, in which form the foreground shutter element 46 shown in FIGURES 9 and 10 is a circular disc which is supported essentially at the perimeter thereof by rotatable grooved guide support pulleys 47, 48, and 49 which are supported by support member 50, and which is rotated essentially from the perimeter of a foreground shutter element 46 by means of a rotating driver shaft 51 and electric motor 52 which, through a speed control means such as rheostat 53, is connected to a source of electric power. It will be apparent of course that upon rotation, foreground shutter element 46 will revolve about an axis central thereof and normal thereto.

FIGURE 11 depicts the dark-shaded configurational element, comprising an outer ring 54 and an inner ring 55, which configurational element is that used in the FIGURES 9 and 12 illustrations and which is attachedly or affixedly supported by light-shaded background element 57 on the viewable side thereof. Likewise supported by and on the viewable side of background element 57 is a dark-shaded centrally-disposed letter 56 in the form of the letter M.

In the FIGURES 9 and 12 showings, there is only one pattern area utilized, the annular area which is traversed by the cycle units opaque dark-shaded first segment 58, opaqe light-shaded second segment 59, and non-opaque third segment 60. It will be seen that foreground shutter elements 46 and 61 each comprise, again in these illustrations, four identical cycle units with each occupying one 90-degree quadrant of the circular foreground shutter element. Upon foreground shutter elements 46 and 61 rotation in an anticlockwise direction as indicated by the arrows of FIGURES 9 and 12, the configurational element rings 54 and 55 will appear to be of a blue-to-indigo color against a light-shaded background, and with opposite clockwise rotation will appear as red-to-orange. In the FIGURE 9 illustration, neither the letter 56 M nor the area of background element 57 therebehind will be seen by the viewer, being continuously obscured by the fully-opaque central portion of the foreground shutter elements 46 shown in this FIGURE 9.

In FIGURE 12 the shown foreground shutter element 61 is identical to the foreground shutter element 46 shown in FIGURE 9 except that it is annularly-shaped, having a non-opaque central portion rather than a fully opaque one. In this case the dark-shaded letter M will appear dark-shaded as it actually is, against a light-shaded background, since this central area does not lie in the single annularly-shaped pattern area and is not traversed by cycle unit sequences. The purpose of the annular shape is to permit, if desired, the showing of articles, printed matter, and the like without generation of color thereon.

At this point it might be pointed out that, while all applicable figures, and the description thereof, in this specification show foreground shutter elements comprising four identical cycle units each, foreground shutter elements in any instance may comprise one, two, three four or any desired or practical number of cycle units, although of course the number used will directly influence the most effective speed of the foreground shutter element, since one of the more important criteria is the frequency of cycle units per second. It has been found generally most effective and practicable, however, to use from two to about six, but preferably four.

In the form of the FIGURES 13–17 showings, the foreground shutter element is supported by and rotated by means of a shaft 62, seen in FIGURE 14, which is disposed concentrically along the central axis of rotation of the circular disc foreground shutter element.

In FIGURES 13–14 the entire device is supported by a stand 63, upon which is located an electric motor 64 which is connected through a speed-control rheostat 65 to a source of electric current. Motor 64 supports and rotates shaft 62 which in turn supports and rotates circular disc foreground shutter element 66, which again in this illustration carries four identical cycle units, each occupying one 90-degree quadrant of the circular foreground shutter element. As is also seen in FIGURES 13–14, stand 63 also supports background element 67, which in turn supports a configurational element comprising a multiplicity of dark-shaded components such as component 68, seen in FIGURES 13, 15, 16, and 17, which may be applied or affixed to background element 67.

In FIGURE 13, the sequence of cycle unit segments of foreground shutter element 66 is shown to be, when the foreground shutter element 66 is rotated counter-clockwise as indicated by the arrow, a dark-shaded first segment 69, a light-shaded second segment 69', and then a non-opaque cut-out apertured third segment 70, which sequence as described hereinbefore will cause the multiplicity of configurational element components 68 throughout the pattern area to appear subjectively to be of a blue-to-indigo color. With the foreground shutter element 68 rotating oppositely, the subjective color will appear to be red-to-orange.

FIGURE 15 depicts foreground shutter element 71, a first modified form of that shown in FIGURE 13, in which it will be seen that the sequence of cycle units segments is such that yellow-to-green will appear subjectively to be the color of the components 68 of the configurational element against light-shaded background element 67 when the foreground shutter element is rotated anti-clockwise as indicated by the arrow, and also when rotated in the opposite clockwise direction. In FIGURE 15 the other elements of the FIGURES 13 and 14 device are omitted for clarity.

FIGURE 16 shows another foreground shutter element 72, which is a second modified form of that shown in FIGURE 13. With this sequence and arrangement of cycle units segments it will be seen that the various components 68 of the configurational element will appear subjectively to be of varying colors in the order, or reverse order, of those in the visible spectrum. With the foreground shutter element 72 revolving anti-clockwise according to the directional arrow, those components 68 circularly around the outer region of the pattern area will appear in blue-to-indigo colors, those circularly around the inner region in red-to-orange, and those circularly around the middle region in yellow-to-green, with intermediate spectrum hues in between these respective three regions. With the foreground shutter element 72 rotating clockwise oppositely, the sequence of the apparent colors, radially, will be the reverse of the foregoing. In FIGURE 16 the unshown elements of the FIGURES 13 and 14 device are omitted for clarity.

FIGURE 17 is shown for clarity of the configurational element, and its components 68, and of the supporting background element 67, as used in the illustrations of FIGURES 13, 15, and 16, and the unshown elements of the FIGURES 13–16 device are omitted for clarity.

In the remaining FIGURES 18–20 there is shown a third form of the third embodiment, in which form the circular disc-shaped foreground shutter element 73 operates as a hand-started free-spinning top having a vertical spindle 74 along the central axis of rotation thereof. Spindle 74 is fixedly attached to foreground shutter element 73, the upper portion thereof providing a means through which the top may be accelerated into rotational motion by a manipulative twisting action of the operator's fingers, and the lower portion thereof being pointedly-shaped at the lower end so as to provide a bearing support on the upper and viewable face of background element 75 upon which there is disposed a configurational element comprising a dark-shaded JOHN A. DOE AND SONS component 76, a dark-shaded 8-circles component 77, and a dark-shaded TOP TOYS component 78. Background element 75 may be supported upon any suitable surface such as a table top. The cycle units, of which there are again four illustrated, are located on the upper viewable surface of foreground element 73 as shown.

With rotation of the illustrated foreground shutter element 73 in the counterclockwise direction indicated by the directional arrow in FIGURE 18, three colors will subjectively appear in the pattern area in consequence of the sequences of cycle units' segments shown; namely, the entire dark shaded JOHN A. DOE AND SONS legend 76 will appear to be blue-to-indigo, the entire dark-shaded 8-circles component 77 will appear to be yellow-to-green, and the entire dark-shaded TOP TOYS legend 78 will appear as red-to-orange.

Rotation in the opposite clockwise direction will reverse the colors of the JOHN A. DOE AND SONS legend 76 and the TOP TOYS legend 78.

With reference to all of the foregoing figures and descriptions thereof, the materials used in the construction of the respective elements of devices falling within the scope of the invention may of course be any which are suitable for the respective purposes intended, and the descriptions thereof should not be construed as limiting in this respect; and likewise, it is intended that matter contained in the descriptions or shown in the drawings should be interpreted in an illustrative and not in a limiting sense, and that variations therefrom in substance or in detail, and including feasible embodiments other than the three principal ones illustrated, and further including variations and combinations of generated subjective color arrangements and of configurational element components and configurations other than those specifically illustrated, are permissible for inclusion when not deviating from the principle, scope, or spirit of the invention as set forth hereinbefore and in the subjoined claims.

I claim:

1. A chromatic color generating device comprising in combination (A) an illuminable, viewable, and movable foreground shutter element comprising (1) at least one cycle unit so disposed and arranged as to be optically repeatable more than about 3 times per second in consequence of continuous motion of said foreground shutter element, said cycle unit comprising (a) on the viewable side thereof at least one opaque essentially dark-shaded first segment, (b) on the viewable side thereof at least one opaque essentially light-shaded second segment, and (c) at least one non-opaque third segment;

(B) at least one background element detachedly disposed with respect to said foreground shutter element such that (1) portions of one side of said background element are successively, intermittently, and repetitively viewable when unobscured by said first and second segments of said cycle unit of said foreground shutter element when said foreground shutter element is in said motion, said viewable side of said background element being essentially light-shaded;

(C) at least one essentially dark-shaded configuration element, about which the subjective effect of chromatic color is to be formed, (1) so disposed as to be viewable against said light-shaded side of said background element when unobscured by said opaque first and second segments of said cycle unit of said foreground shutter element when said foreground shutter element is in said motion;

(D) means for supporting said foreground shutter element, said background element, and said configurational element; and (E) means by which motion of said foreground shutter element may be caused.

2. A chromatic color generating device as in claim 1 wherein (A) the said opaque dark-shaded first segment of said cycle unit of said foreground shutter element, and the said dark-shaded configurational element, are essentially black; and wherein (B) the said opaque light-shaded second segment of said cycle unit of said foreground shutter element, and the said viewable side of said background element, are essentially white.

3. A chromatic color generating device as in claim 1 wherein (A) the said opaque dark-shaded first segment of said cycle unit of said foreground shutter element, and the said dark-shaded configurational element, are essentially black; and wherein (B) the said opaque light-shaded second segment of said cycle unit of said foreground shutter element, and the viewable side of said background element, are of a reflective silvery-lustered hue.

4. A chromatic color generating device as in claim 1 wherein (A) said dark-shaded first segment comprises durationally about ⅓, (B) said light-shaded second segment, disposed between said dark-shaded first segment and said non-opaque third segment, comprises durationally about ⅓, and (C) said non-opaque third segment comprises durationally about ⅓ of said cycle unit of said foreground shutter element, for producing the subjective effect of color in the red-to-orange range when said foreground shutter element is in continuous motion in one direction at a rate of about 10 cycle units per second, and in the blue-to-indigo range when said motion is in the opposite direction.

5. A chromatic color generating device as in claim 1 wherein (A) said cycle unit of said foreground shutter element comprises in essentially-adjacent succession (1) an opaque essentially dark-shaded first segment comprising about ⅓ thereof, (2) a first opaque essentially light-shaded second segment comprising about ⅙ thereof, (3) a non-opaque third segment comprising about ⅓ thereof, and (4) a second opaque essentially light-shaded second segment comprising about ⅙ thereof, for producing the subjective effect of color in the yellow-to-green range when said foreground shutter element is in continuous motion at a rate of about 10 cycles per second.

6. An embodiment of a chromatic color generating device as in claim 1 wherein (A) said foreground shutter element is cylindrical and rotationally movable, as a rotating drum, about a centrally disposed longitudinal axis of rotation thereof, and wherein (B) said background element and said configurational element are contained within the space circumferentially bounded by said cylindrical foreground shutter element.

7. An embodiment of a chromatic color generating device as in claim 1 wherein (A) said foreground shutter element is a flexible endless strip translationally movable, as an endless belt, between a plurality of rotating drums, and wherein (B) said background element and said configurational element are contained within the space bounded by said endless-strip foreground shutter element.

8. An embodiment of a chromatic color generating device comprising in combination (A) an illuminable, viewable, and essentially flat foreground shutter element rotatable about an axis of rotation disposed centrally thereof and normal thereto, comprising (1) at least one cycle unit so disposed and arranged as to be optically repeatable more than about 3 times per second in consequence of continuous rotary motion of said foreground shutter element, said cycle unit comprising (a) on the viewable side thereof at least one opaque essentially dark-shaded first segment, (b) on the viewable side thereof at least one opaque essentially light-shaded second segment, and (c) at least one non-opaque third segment;

(B) at least one essentially flat background element detachedly disposed with respect to said flat foreground shutter element such that (1) portions of one side of said background element are successively, intermittently, and repetitively viewable when unobscured by said first and second segments of said cycle unit of said foreground shutter element when said foreground shutter element is in said rotational motion, said viewable side of said background element being essentially light-shaded;

(C) at least one essentially dark-shaded configurational element, about which the subjective effect of chromatic color is to be formed, (1) so disposed as to be viewable against said light-shaded side of said flat background element when unobscured by said opaque first and second segments of said cycle unit of said foreground shutter element when said foreground shutter element is in said rotational motion;

(D) means for supporting said foreground shutter element, said background element, and said configurational element; and (E) means by which motion of said foreground shutter element may be caused.

9. A chromatic generating device as in claim 8 wherein (A) the said opaque dark-shaded first segment of said cycle unit of said foreground shutter element, and the said dark-shaded configurational element, are essentially black; and wherein (B) the said opaque light-shaded second segment of said cycle unit of said foreground shutter element, and the said viewable side of said background element, are essentially white.

10. A chromatic color generating device as in claim 8 wherein (A) the said opaque dark-shaded first segment of said cycle unit of said foreground shutter element, and the said dark-shaded configurational element, are essentially black; and wherein (B) the said opaque light-shaded second segment of said cycle unit of said foreground shutter element, and the viewable side of said background element, are of a reflective silvery-lustered hue.

11. A chromatic color generating device as in claim 8 wherein (A) said dark-shaded first segment comprises durationally about 1/3, (B) the said opaque light-shaded second segment of tween said dark-shaded first segment and said non-opaque third segment, comprises durationally about 1/3, and (C) said non-opaque third segment comprises durationally about 1/3 of said cycle unit of said foreground shutter element, for producing the subjective effect of color in the red-to-orange range when said foreground shutter element is in continuous rotational motion one direction at a rate of about 10 cycle units per second, and in the blue-to-indigo range when said rotational motion is in the opposite direction.

12. A chromatic color generating device as in claim 8 wherein (A) said cycle unit of said foreground shutter element comprises in essentially-adjacent succession (1) an opaque essentially dark-shaded first segment comprising durationally about 1/3 thereof, (2) a first opaque essentially light-shaded second segment comprising durationally about 1/6 thereof, (3) a non-opaque third segment comprising durationally about 1/3 thereof, and (4) a second opaque essentially light-shaded second segment comprising durationally about 1/6 thereof, for producing the subjective effect of color in the yellow-to-green range when said foreground shutter element is in continuous rotational motion at a rate of about 10 cycles per second.

13. A chromatic color generating device as in claim 8 wherein (A) said foreground shutter element is an essentially circular disc supported essentially at and rotated essentially from the perimeter thereof, and wherein (1) said cycle unit is positioned and arranged concentrically about said centrally disposed axis of rotation of said circular disc, and wherein (a) said non-opaque third segment is an apertured section in said circular disc; and wherein (B) said dark-shaded configurational element is applied to the intermittently viewable side of said background element.

14. A chromatic color generating device as in claim 13 wherein (A) said non-opaque third segment is a transparent section in said circular disc.

15. A chromatic color generating device as in claim 13 wherein said foreground shutter element is an annularly-shaped disc supported essentially at and rotated essentially from a perimeter thereof.

16. A chromatic color generating device as in claim 15 wherein (A) said non-opaque third segment is a transparent section in said annularly-shaped disc.

17. A chromatic color generating device as in claim 8 wherein (A) said foreground shutter element is an essentially circular disc attachable to, supported by, and rotated by means of, a shaft disposed concentrically along said axis of rotation of said foreground shutter element, and wherein (1) said cycle unit is positioned and arranged concentrically about said centrally disposed axis of rotation of said circular disc, and wherein (a) said non-opaque third segment is an apertured section in said circular disc; and wherein (B) said dark-shaded configurational element is applied to the intermittently viewable side of said background element.

18. A chromatic color generating device as in claim 17 wherein (A) said non-opaque third segment is a transparent section in said circular disc.

References Cited by the Examiner

UNITED STATES PATENTS

| | | | |
|---|---|---|---|
| 748,661 | 1/1904 | Scott | 46—49 |
| 984,044 | 2/1911 | Spencer | 46—49 |
| 1,869,776 | 7/1932 | Precourt | 46—47 X |

OTHER REFERENCES

Physiological Optics, by Helmholtz, published by Professional Press, Chicago, Ill., vol. II, 1927, pages 176–178 cited.

DELBERT B. LOWE, *Primary Examiner.*

R. F. CUTTING, *Assistant Examiner.*

There's a later patent to one "Nadon" cited in 178 (TV about 1950?